United States Patent
Harary et al.

(12) 
(10) Patent No.: US 6,429,961 B1
(45) Date of Patent: Aug. 6, 2002

(54) METHODS FOR RETROFITTING WINDOWS WITH SWITCHABLE AND NON-SWITCHABLE WINDOW ENHANCEMENTS

(75) Inventors: Joseph M. Harary, Brooklyn; Robert L. Saxe, New York, both of NY (US)

(73) Assignee: Research Frontiers Incorporated, Woodbury, NY (US)

( * ) Notice: Subject to any disclaimer, the term of this patent is extended or adjusted under 35 U.S.C. 154(b) by 46 days.

(21) Appl. No.: 09/677,923

(22) Filed: Oct. 3, 2000

(51) Int. Cl.[7] .......................... G02B 26/00; G02F 1/15; E06B 3/30
(52) U.S. Cl. .................. 359/296; 359/265; 359/267; 359/280; 359/320; 359/894; 52/204.54; 52/204.67; 52/171.13; 428/426
(58) Field of Search .................. 359/296, 252, 359/253, 265, 267, 275, 280, 282, 320, 894; 52/204.54, 204.67, 204.69, 171.3, 786.11; 428/212, 426; 348/834, 835, 842; 349/137

(56) References Cited

U.S. PATENT DOCUMENTS

| | | | |
|---|---|---|---|
| 4,247,175 A | 1/1981 | Saxe | 359/296 |
| 4,407,565 A | 10/1983 | Saxe | 359/296 |
| 4,877,313 A | 10/1989 | Saxe et al. | 359/253 |
| 5,002,701 A | 3/1991 | Saxe | 252/586 |
| 5,093,041 A | 3/1992 | Check, III et al. | 252/585 |
| 5,099,621 A | * 3/1992 | Schacklette et al. | 52/171.3 |
| 5,409,734 A | 4/1995 | Lee et al. | 427/163.1 |
| 5,463,491 A | 10/1995 | Check, III | 359/296 |
| 5,463,492 A | 10/1995 | Check, III | 359/296 |
| 5,516,463 A | 5/1996 | Check, III et al. | 252/585 |
| 5,713,167 A | * 2/1998 | Durham | 52/204.54 |
| 5,790,298 A | * 8/1998 | Tonar | 359/267 |
| 5,822,107 A | * 10/1998 | Lefrou et al. | 359/275 |

* cited by examiner

Primary Examiner—Loha Ben
(74) Attorney, Agent, or Firm—Cooper & Dunham

(57) ABSTRACT

A method for retrofitting a window by combining the window with a switchable or non-switchable window enhancement. The method includes providing a window comprising at least one relatively transparent viewing pane with first and second opposed viewing surfaces, and optionally a frame portion adapted to support and position the viewing pane(s); providing at least one mounting means adapted for securing the enhancement to the window; and securing a window enhancement to the window with at least one mounting means so that the enhancement overlies at least a portion of the viewing pane, and wherein a gap is produced between the window and the enhancement equal in width to the thickness of the mounting means. The enhancement may be mounted on either the viewing pane itself, or alternately upon the frame portion of the window. If desired, the enhancement may be laminated to a relatively rigid substrate prior to application to the window. The invention is further directed to improved, retrofitted windows produced by the method of the invention.

61 Claims, 1 Drawing Sheet

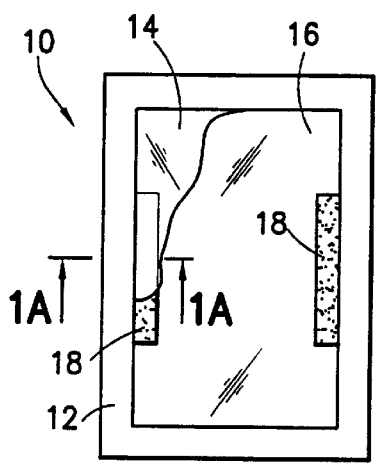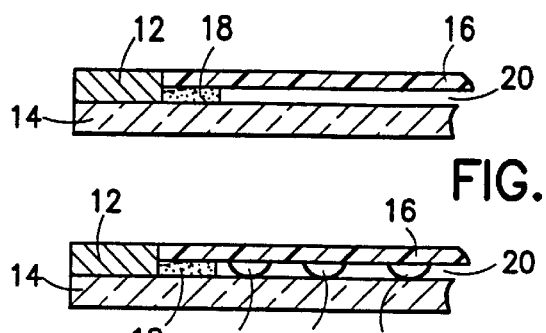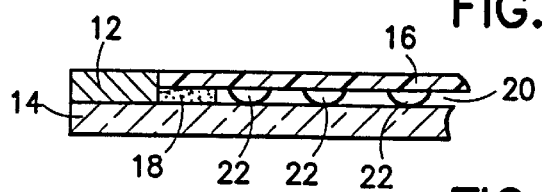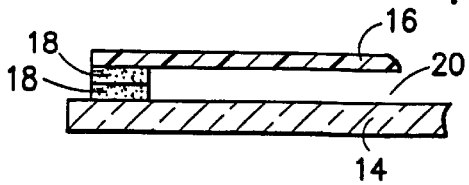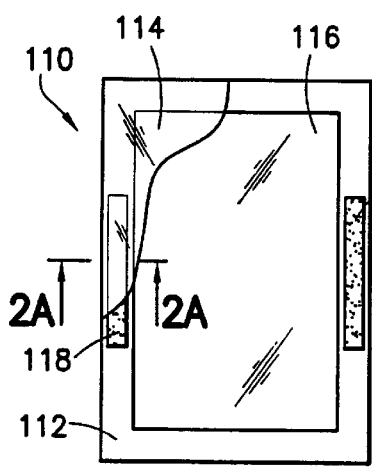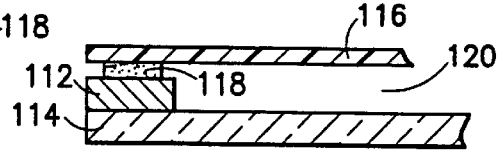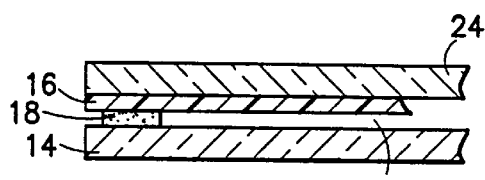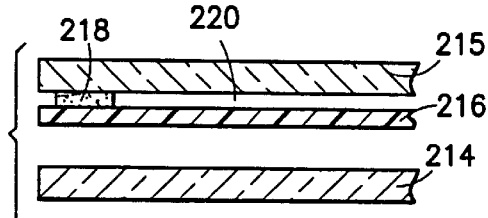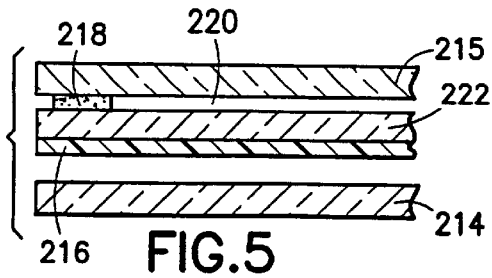

METHODS FOR RETROFITTING WINDOWS WITH SWITCHABLE AND NON-SWITCHABLE WINDOW ENHANCEMENTS

FIELD OF THE INVENTION

This invention relates to modifying conventional glass or plastic windows by combining such windows with a switchable glazing such as an SPD film or an SPD light valve or with a non-switchable device such as a tinted window or screen in a simple, novel and cost effective manner, and to the retrofitted windows produced thereby.

BACKGROUND OF THE INVENTION

Light valves have been in use for more than sixty years for the modulation of light. As used herein, a light valve is defined as a cell formed of two walls that are spaced apart by a small distance, at least one wall being transparent, the walls having electrodes thereon, usually in the form of transparent, electrically conductive coatings. The cell contains a light-modulating element (sometimes herein referred to as an "activatable material"), which may be either a liquid suspension of particles, or a plastic film in which droplets of a liquid suspension of particles are distributed.

The liquid suspension (sometimes herein referred to as "a liquid light valve suspension" or "a light valve suspension") comprises small, anisometrically shaped particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles, and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices" or "SPDs."

Light valves have been proposed for use in numerous applications including, e.g., alphanumeric and graphic displays; television displays; filters for lamps, cameras, optical fibers, and windows, sunroofs, sunvisors, eyeglasses, goggles and mirrors and the like, to control the amount of light passing therethrough or reflected therefrom as the case may be. As used herein the term "light" generally refers to visible electromagnetic radiation, but where applicable, "light" can also comprise other types of electromagnetic radiation such as, but not limited to, infrared radiation.

For many applications, as would be well understood in the art it is preferable for the activatable material, i.e., the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects, e.g., bulging, associated with a high column of liquid suspension, can be avoided through use of a film, and the risk of possible leakage can also be avoided. Another advantage of using a plastic film is that in a plastic film, the particles are generally present only within very small droplets, and hence do not noticeably agglomerate when the film is repeatedly activated with a voltage.

As used herein, the terms "SPD film" or "light valve film" mean at least one film or sheet comprising a suspension of particles used or intended for use by itself or as part of a light valve. The light valve film or SPD film comprises either: (a) a suspension of particles dispersed throughout a continuous liquid phase enclosed within one or more rigid or flexible solid films or sheets, or (b) a discontinuous phase of a liquid comprising dispersed particles, the discontinuous phase being dispersed throughout a continuous phase of a rigid or flexible solid film or sheet. The light valve film or SPD film may also comprise one or more other layers such as, without limitation, a film, coating or sheet, or combination thereof, which may provide the light valve film or SPD film with (1) scratch resistance (2) protection from ultraviolet radiation (3) reflection of infrared energy, and/or (4) electrical conductivity for transmitting an applied electric or magnetic field to the activatable material.

U.S. Pat. No. 5,409,734 exemplifies a type of light valve film that is formed by phase separation from a homogeneous solution. Light valve films made by cross-linking emulsions are also known. Examples of these are described in U.S. Pat. Nos. 5,463,491 and 5,463,492, both of which are assigned to the assignee of the present invention.

The following is a brief description of liquid light valve suspensions known in the art which are useful in forming windows retrofitted with a switchable glazing, although the invention is not limited to the use of only such suspensions, nor is it limited to the use of switchable glazings per se since alternate classes of light modulating devices, (e.g., non-switchable devices) as described below, can be used in place of such switchable window enhancements.

1. Liquid Suspending Media and Stabilizers

A liquid light valve suspension for use with the invention may be any liquid light valve suspension known in the art and may be formulated according to techniques well known to one skilled in the art. The term "liquid light valve suspension", as used herein, means a "liquid suspending medium" in which a plurality of small particles is dispersed. The "liquid suspending medium" comprises one or more non-aqueous, electrically resistive liquids in which there is preferably dissolved at least one type of polymeric stabilizer, which acts to reduce the tendency of the particles to agglomerate and to keep them dispersed and in suspension.

Liquid light valve suspensions useful in the present invention may include any of the liquid suspending media previously proposed for use in light valves for suspending the particles. Liquid suspending media known in the art which are useful herein include, but are not limited to the liquid suspending media disclosed in U.S. Pat. Nos. 4,247,175 and 4,407,565. In general, at least one of the liquid suspending medium and the polymeric stabilizer dissolved therein is chosen in a manner known in the art so as to maintain the suspended particles in gravitational equilibrium.

The polymeric stabilizer, when employed, can be a single solid polymer that bonds to the surface of the particles, but which also dissolves in the non-aqueous liquid or liquids of the liquid suspending medium. Alternatively, two or more solid polymeric stabilizers may serve as a polymeric stabilizer system. For example, the particles can be coated with a first type of solid polymeric stabilizer such as nitrocellulose which, in effect, provides a plain surface coating for the particles, after which they are re-coated with one or more additional types of solid polymeric stabilizer that bond to or associate with the first type of solid polymeric stabilizer and which also dissolves in the liquid suspending medium to provide dispersion and steric protection for the particles. Also, liquid polymeric stabilizers may be used to advantage, especially in SPD light valve films, as described in U.S. Pat. No. 5,463,492.

2. Particles

Inorganic and organic particles may be incorporated into a light valve suspension useful in forming a switchable enhancement for use in retrofitting a window in accordance with the present invention. Such particles may be either light-absorbing or light-reflecting in the visible portion of the electromagnetic spectrum. For some particular applications the particles can be reflective at infrared wavelengths.

Conventional SPD light valves have generally employed polyhalide particles of colloidal size, that is the particles generally have a largest dimension averaging about 1 micron or less. As used herein, the term "colloidal", when referring to particle size, shall have the meaning given in the preceding sentence. Preferably, most polyhalide or other particles used or intended for use in an SPD light valve suspension used in accordance with the invention will have a largest dimension which averages less than one-half of the wavelength of blue light, i.e., less than 2000 Angstroms, to keep light scatter extremely low. As used herein, the term "anisometric", which refers to particle shape, means that at least one dimension is larger than another. Typically, anisometric particles (sometimes referred to as particles which are anisometrically shaped), are desirable in an SPD light valve suspension so that the particles will block less light when the suspension is activated than when it is unactivated. For some suspensions the reverse is true, however. Desirable anisometric shapes for the particles include, without limitation thereto, particles shaped like rods, cylinders, plates, needles, blades, prisms, and other shapes known in the art.

A detailed review of prior art polyhalide particles is found in "The Optical Properties and Structure of Polyiodides" by D. A. Godina and G. P. Faerman, published in "The Journal of General Chemistry", U.S.S.R. Vol. 20, pp. 1005–1016 (1950).

Herapathite, for example, is defined as a quinine bisulfate polyiodide, and its formula is given under the heading "quinine iodsulfate" as $4C_{20}H_{24}N_2O_2.3H_2SO_4.2HI.I_4.6H_2O$ in The Merck Index, $10^{th}$ Ed. (Merck & Co., Inc., Rahway, N.J.). In polyiodide compounds, the iodide anion is thought to form chains and the compounds are strong light polarizers. See U.S. Pat. No. 4,877,313 and Teitelbaum et al. JACS 100 1978), pp. 3215–3217. The term "polyhalide" is used herein to mean a compound such as a polyiodide, but wherein at least some of the iodide anion may be replaced by another halide anion. More recently, improved polyhalide particles for use in light valves have been proposed in U.S. Pat. Nos. 4,877,313, 5,002,701, 5,093,041 and 5,516,463. These "polyhalide particles" are formed by reacting organic compounds, usually containing nitrogen, with elemental iodine and a hydrohalide acid or an ammonium halide, alkali metal halide or alkaline earth metal halide.

For some applications, however, it may be desirable to use non-polyhalide particles in light valve suspensions and films, especially where the stability of the material composing the particles is known to be excellent.

Regardless of the type of window enhancement, such as an SPD film or SPD light valve, which is involved, it is desirable to have a convenient and cost-effective method of combining the enhancement with a conventional, i.e., unenhanced, window in order to provide improved performance beyond that of the conventional window alone. Windows have frequently been retrofitted in the prior art on their outside, i.e., exterior, surfaces with plastic films that, for example, reflect infrared heat or make the window breakage resistant, by directly laminating the plastic film to the viewing area of the window with an adhesive. Such arrangements present technical difficulties, however, such as avoiding wrinkles or trapped air bubbles or solvent between the film and the window. The present invention offers a convenient alternative by substantially avoiding such direct lamination to most or all of the viewing area of the window, by instead securing the window enhancement or switchable glazing to (a) the window frame, or (b) a small area on the viewing area of the window at or near the edge or edges of the window via securing means in a manner so as to produce a narrow "gap" between the enhancement and the window at those portions of the enhancement not in contact with the securing means. The modification of a conventional window by combining the window in some manner with a window enhancement, i.e., a switchable glazing or non-switchable light modulating device, is referred to herein as "retrofitting" the conventional window.

The terms "window" and "conventional window" as used herein include both glass and plastic windows, and combinations thereof, with any number of panes, i.e., single-pane and multi-pane, e.g., double-glazing, windows of any composition, size and shape, whether or not tinted, including both the window viewing area and frame, and for all uses such as, but not limited to, windows used in architectural and automotive vehicle applications, as well as windows used in various other transportation vehicles such as, boats, trains, aircraft, spacecraft and space stations, and windows used in greenhouses.

It should be further understood that, although not part of the present invention, one could arrange to place a separate (not physically combined) window enhancement such as an SPD film or SPD light valve in series with a window. For example, in a building, one could affix the frame of an SPD light valve to the wall of the building so that the light valve and window were in series. If hinges were used, it would be possible to place the light valve in front of the window, or swing it out of that position, as desired. However, such arrangements where the enhancement is separate from the window, i.e., not physically combined to some extent, are not deemed retrofitting as that term is used herein and are thus not considered as forming a part of the present invention.

SUMMARY OF THE INVENTION

As indicated above, therefore, the present invention is directed to methods for retrofitting a "conventional" window with switchable and non-switchable window enhancements. The invention is further directed to the improved retrofitted windows produced by the method, i.e., improved in that they avoid the technical difficulties (wrinkles, trapped air and/or solvent bubbles, etc.) as discussed above.

In a first embodiment, the invention is directed to a method for retrofitting a window by physically combining the window with a window enhancement, as that term is defined herein. The method includes providing a window comprising at least a relatively transparent viewing pane with first and second opposed viewing surfaces; providing at least one means for mounting the enhancement (described below) for securing the window enhancement to the window; and securing the window enhancement to the window with the at least one mounting means in a manner wherein the enhancement overlies at least a portion of the viewing pane.

The mounting means is adapted such that upon its use in mounting the enhancement, a gap is produced between the enhancement and the window in those areas where the enhancement is not in contact with the mounting means. The existence of the gap thus prevents problems such as wrinkling and/or entrapment of liquids. The gap may, if desired, be at least partially filled with air or some inert gas, or alternately the air may be at least partially evacuated from the gap, thus producing an at least partial vacuum condition between the window and the enhancement.

In one embodiment of the invention, the at least one mounting means may be installed on the viewing pane portion of the window. One may choose, for example, to position the mounting means along two opposed edge portions on one viewing surface of the pane, e.g., at the top and the bottom of the window pane, or along the left and the right sides thereof. Alternately, if desired, the enhancement can be mounted, for example, on a plurality of mounting means located, e.g., at the top, the bottom and one or more of the longitudinal side edges of the viewing pane.

In a further embodiment, the enhancement may first be laminated, directly or indirectly, to a relatively rigid substrate formed, e.g., of glass or a plastic, with the resultant laminate thereafter being secured to the viewing pane with the use of the mounting means.

Window enhancements chosen for use with the present invention may comprise, e.g., a switchable glazing such as an SPD film, an SPD light valve, an electrochromic film or window or a liquid crystal film or window. In alternate applications, however, the window enhancement used in the method of the invention may comprise a non-switchable light modulating device, such as a tinted window or screen, a solar control film, an impact resistant film or a flexible or rigid panel.

In a further alternate embodiment of the invention, the mounting means may initially be mounted directly upon the enhancement which then, in turn, is secured to the window by the use of such means.

The window may further comprise a frame portion configured and adapted to support the viewing pane. The frame typically comprises a top member, a bottom member, and first and second longitudinal side members, wherein the side members are connected, at opposite ends thereof, to the top and bottom members to form the frame portion. If desired, the enhancement may be secured upon the window frame portion instead of, or in addition to securing it to the window viewing pane. When securing the embodiment to the frame portion, the mounting means may be positioned at a variety of locations, i.e., on the top and bottom frame members, or at the left and right longitudinal sides of the frame or, if desired, on all four of the members which comprise the frame portion. Notwithstanding whether the mounting means are positioned upon the viewing pane or the frame portion however, a gap, as described above, is produced between the enhancement and the window due to the mounting means, which gap overcomes the deficiencies noted in the prior art. As with the embodiment described above, the gap may be at least partially filled with a gas (e.g., air or some inert gas) or at least partially evacuated.

In another embodiment of the invention, at least one projecting spacer member (and preferably a plurality of such members) may be provided between the enhancement and the window, in the gap therebetween, which spacer member(s) are sized and configured to maintain the gap at a predetermined width, i.e., to prevent sagging of the enhancement towards the surface of the window.

In an alternate embodiment of the invention, the mounting means may be positioned at corresponding locations upon both the window and the window enhancement. Thus, the width of the gap therebetween is increased to the thickness of two such means, positioned one above, i.e., atop, the other.

Mounting means useful in the present invention may be chosen from a variety of fastening and securing devices well known in the art. One preferred means for mounting the enhancement upon the window is through the use of one or more securing strips, i.e., swatches of a plastic or cloth material provided upon at least a portion of their outer surfaces with an adhesive material to permit securing them to, e.g., the viewing pane and/or the frame portion of a window, as well as to the surface of the window enhancement chosen for mounting upon the window. Alternate mounting means may include, but are not limited to, a variety of fastening devices such as screws, nails, bolts, snaps, rivets, staples, magnetized metal bars and the like. Some such alternate means, i.e., such as screws, bolts and the like may be provided with a spacer member, i.e., a washer or an o-ring, to assist in maintaining the gap between the window and the enhancement. These alternate fasteners are preferred for use when the enhancement is to be mounted upon the frame portion of the window, i.e., and not the viewing pane, since driving, e.g., a screw or rivet, into a glass viewing pane to mount the enhancement would likely damage or perhaps destroy the pane. Such would not be the case, however, in the case of plastic panes and thus such alternate mounting means may be used on window panes comprised of plastic.

It is, moreover, desirable, although not required, that, when adhesive-backed securing strips are used as the mounting means, the window be cleaned by substantially removing any dust or dirt therefrom prior to mounting the securing strips, to enhance the adhesion of the strips. The strips are typically provided with an adhesive material on at least one surface thereof to facilitate bonding, i.e., to the window and/or to the enhancement. The adhesive material may be selected, for example, from pressure sensitive adhesives and heat or radiation curable adhesives. The adhesive surface(s) may, if desired, be protected with a removable release paper, which is removed from the strip and discarded prior to application of the strip to the window and/or the enhancement.

In those embodiments which, as described above, utilize mounting means such as securing strips positioned at corresponding locations (e.g., face-to-face) upon both the window (the viewing pane or the frame) and the enhancement, such strips may, for example, comprise a fabric or plastic swatch that incorporates a magnetic material, such that the enhancement is at least partially secured to the window as a result of a magnetic attraction between corresponding ones of said strips. In an alternate embodiment, the strips may instead include hook and loop (e.g., Velcro® brand) fastener arrangements whereupon the enhancement is mounted to the window due to interengagement of the hooks and the loops on corresponding ones of the securing strips.

If desired, either the window enhancement or the viewing pane portion of the window, may be provided with a coating, such as an anti-reflective coating, or some form of protectant coating, which is applied thereto in a manner well known in the art.

In a further embodiment of the invention, the window may comprise a plurality of viewing panes positioned in series and spaced apart, one from the other, due to their position within the window frame portion. In such an embodiment, the enhancement may be positioned adjacent an inner surface of one of the viewing panes, and secured either to the pane or alternately upon an abutting surface of the frame portion extending into the space between the viewing panes, wherein a first surface of the enhancement is separated from the window by the above-described gap formed due to the thickness of the mounting means, and the second, opposed surface of the enhancement is exposed to the space between the two adjacent panes. One particular example of the above-described arrangement is a double pane or so-called double-glazing window wherein the enhancement is applied to an inner surface of one of the viewing panes, i.e., one of the surfaces exposed to the space between the two viewing panes.

In still another embodiment, the invention comprises a method for retrofitting a multi-pane window with a window enhancement. The method involves providing a window comprising a frame portion together with a plurality of relatively transparent viewing panes positioned in series within the frame, with the frame being configured and adapted to support the viewing panes and to separate them one from another by maintaining a space between adjacent panes. The method further includes providing at least one window enhancement selected from among switchable and non-switchable window enhancements for combining with the window; and securing, with the use of the above-described securing means, a window enhancement upon at least a portion of at least one of the viewing panes, on an inner surface of the pane separated by such space from the next adjacent pane. If desired, the enhancement may initially be laminated upon a supporting substrate, such as a sheet of plastic or glass, whereupon the resultant laminate is thereafter secured to the inside surface of the viewing pane with the use of the securing means. The window enhancement may comprise, e.g., a switchable glazing such as an SPD film, SPD light valve, an electrochromic film or window or a liquid crystal film or window. Alternately the enhancement may instead be a non-switchable light modulating device chosen from among, for example, a tinted window, a screen, a solar control film, impact resistant film or a flexible or rigid panel.

The invention is further directed to improved retrofitted windows produced by the method of the invention. One embodiment includes, in combination, a window retrofitted with a switchable or a non-switchable window enhancement, wherein the combination includes a window comprising a frame portion and at least one relatively transparent viewing pane, wherein the frame portion is adapted to secure and support the at least one pane in a desired orientation. The combination additionally comprises a window enhancement selected from the group including switchable and non-switchable window enhancements, wherein the enhancement is secured to the window with the use of at least one securing means; and at least one securing means for securing the window enhancement to the window, such that when the enhancement is in place upon the window a gap is produced between the enhancement and the window. When securing strips are used as the securing means each said securing strip comprises at least one surface provided with an adhesive component. Such strips may, if desired, be provided as well with an additional bonding component such as a magnetic material or a hook and loop fabric arrangement.

In a still further embodiment, the combination may additionally comprise a plurality of spacer members adapted to maintain the width of the gap between the window and the enhancement at a substantially constant dimension. These members may be installed upon the enhancement and project from the enhancement toward the window. Alternately, they may be installed upon the window, whereupon they project from the window toward the enhancement. In another embodiment of the retrofitted window produced according to the invention, the enhancement may initially be laminated to an underlying substrate formed, e.g., of a sheet of glass or plastic which is, in turn, secured to the window with the aid of the mounting means.

BRIEF DESCRIPTION OF THE DRAWINGS

FIG. 1 provides a perspective view of a retrofitted window according to a first embodiment of the invention;

FIG. 1A is a cross-sectional view through FIG. 1 taken along the line 1A—1A;

FIG. 1B is a cross-sectional view similar to that provided in FIG. 1A but illustrating, in addition, a series of spacer members which assist in spacing the window enhancement apart from the surface of the window;

FIG. 1C is a cross-sectional view through an alternate embodiment of the retrofitted window of the invention, wherein the enhancement is secured to the window with the use of pairs of securing strips located in corresponding positions on the window and on the enhancement;

FIG. 2 is a perspective view of a retrofitted window according to an alternate embodiment of the invention;

FIG. 2A is a cross-sectional view through FIG. 2 taken along the line 2A—2A;

FIG. 3 is a sectional view through a retrofitted window in accordance with another embodiment of the invention in which the enhancement is laminated to an underlying substrate which laminate is then, in turn, secured to the window;

FIG. 4 is a sectional view through a retrofitted window in accordance with a further embodiment of the invention wherein the enhancement is mounted to an interior surface of one of a pair of viewing panes in a double-glazing window; and FIG. 5 is a view similar to that of FIG. 4 except that the enhancement is laminated upon an underlying substrate, which laminate is then, in turn, secured to the window.

DETAILED DESCRIPTION OF THE INVENTION

The present invention enables one to easily retrofit a window by combining the window with either a switchable or a non-switchable window enhancement in a novel and cost-effective manner. Furthermore, the present invention avoids, or at least greatly reduces, problems encountered using prior art retrofitting techniques, such as film wrinkles and trapped water or other liquids, and saves a great deal of time (and therefore expense) otherwise normally associated with the retrofitting process.

As used herein the term "switchable window enhancement" includes both the SPD films and the SPD light valves described above. However, there are other known technologies for switchably modulating the amount of light that can be transmitted through a window, either electrically or otherwise, and such technologies are also included within the scope of switchable window enhancements useful in the invention. These technologies include, without limitation thereto, electrochromic films and windows and liquid crystal films and windows.

The invention is further directed to retrofitting windows with non-switchable types of light modulating devices which may be used in place of switchable devices. Such non-switchable devices include, but are not limited to tinted windows, screens, solar control films, impact resistant films, and flexible or rigid panels.

For the sake of convenience the method of the invention is described generally herein in the context of retrofitting a window with an SPD film. It must be understood, however, that the invention is not to be construed as being useful only with such SPD films. That is, the scope of the invention is also intended to cover the use of the other switchable enhancements taught herein, as well as a variety of non-switchable types of light modulating devices as disclosed above. Additionally, again for the sake of convenience and clarity, the description of the invention contained herein is directed predominantly to the use of securing strips as mounting means. As noted above in the summary of the invention, however, the invention is not to be limited to use with such strips, which may, if desired, be replaced by any of a variety of fastening or securing devices known in the art, such as bolts, rivets, nails, screws, staples, etc. As the operation of such nails, screws, etc. is so well known in the art, it is not believed to be necessary to provide drawing illustrating their use as mounting means. The invention is further defined below with particular reference to the drawing figures submitted herewith.

Turning initially to FIG. 1, there is shown retrofitted window 10 produced in accordance with a first embodiment of the invention. Window 10 as shown includes frame portion 12, viewing pane 14 and enhancement 16 (shown partially broken away) which for illustrative purposes is a switchable SPD film, but which, as noted above, is not limited to such films. Enhancement 16 typically covers substantially the entire viewing surface of pane 14 but, if desired for a particular application, the enhancement may be applied over only a portion of the pane.

Enhancement 16 is shown mounted upon pane 14 in the illustrated embodiment with the use of mounting means comprised of securing strips 18. Although referred to herein as "strips", it is to be understood that their shape is not critical, i.e., they need not be "strip-shaped". "Strips" 18 could thus be shaped as squares, dots, triangles or any other shape which would achieve the intended purpose of securing the enhancement 16 upon window 10. Moreover, the number and placement of strips 18 is also not critical, so long as they serve to retain enhancement 16 in place. Thus, the strips could be provided, for example, at the top and bottom of the pane 14, at the left and right sides thereof, or in a variety of additional configurations which may readily suggest themselves to one of ordinary skill in this art. Furthermore, while the illustration shows a single strip along each longitudinal pane edge, each such strip may, if desired be replaced by a plurality of such strips, in a variety of shapes as discussed above, to maintain enhancement 16 in position upon pane 14. Because strips 18 occupy only a small area relative to that of pane 14 as a whole, prior art problems such as wrinkles or trapped liquids can be eliminated or at least greatly reduced.

As to the strips 18 themselves, they are preferably formed with opposed adhesive surfaces to assist in securing them to pane 14 and enhancement 16. There are numerous commercial suppliers for adhesive materials useful with the securing strips 18 of the present invention. A list of such companies may be found, for example, in the *Chemical Week* 2000 *Buyers Guide*. Another company with a broad line of adhesive products is the Adhesives Division of Avery Dennison Corp., located in Flint, Mich. The adhesive is typically selected from among pressure sensitive adhesives, heat curable adhesives and radiation curable adhesives, although other types of adhesives, not mentioned above, may be considered for use under appropriate circumstances. The adhesive surface(s) of strips 18 are preferably protected, prior to use, by a release paper which may be readily stripped away from the adhesive and discarded when it is desired to mount the strips 18 on pane 14 or enhancement 16 upon strips 18. It is often desirable, moreover, to clean the surface of pane 14 before attaching strip(s) 18 thereto by removing any dust, grease etc. therefrom to provide a more secure grip between strip 18 and pane 14. Strips 18 are preferably manufactured from a substantially transparent material so that they are relatively invisible when mounted on window 10.

FIG. 1A provides a cross-sectional view through the retrofitted window 10 of FIG. 1. As shown in FIG. 1A, strip 18 serves to space enhancement 18 away from the surface of pane 14 by a distance equal to the thickness of the strip, thus producing a gap 20 between the pane and the enhancement. When other types of mounting means (i.e., other than strips 18) are utilized, e.g., a nail or screw, it may be useful to interpose a spacer member, such as a washer or o-ring, to assist in creating the gap between the window and the enhancer. In order to maintain a relatively uniform gap thickness, enhancement 16 should be relatively rigid, although alternate means (discussed below) for maintaining the gap width are within the scope of this invention. Gap 20 may, if desired, be filled with air, or some inert gas, i.e., one of the so-called noble gasses (e.g., helium, neon, argon, etc.). Alternatively, if desired, the atmosphere within gap 20 may be at least partially evacuated, thus producing a partial vacuum condition therein.

Some alternate methodologies for maintaining the width of gap 20 are illustrated in FIGS. 1B and 3. FIG. 1B illustrates the use of a plurality of projecting spacer members 22 which are shown as small, preferably colorless, plastic or glass dimples which may either be secured upon pane 14 to project toward enhancement 16, or vice versa. The "dimple", i.e., rounded, shape is for illustration only and a variety of alternate shapes could be used instead as would be well understood by one of ordinary skill in this art. Members 22 are positioned at intervals to prevent enhancement 16 from sagging toward pane 14. In a preferred embodiment the refractive index of the material used in forming members 22 is matched, as closely as is possible, to that of pane 14 and/or enhancement 16 to render them as "invisible" as possible to one looking through window 10.

Turning to FIG. 3 there is shown an alternate means for substantially maintaining the width of gap 20. As illustrated therein, the enhancement 16 is applied directly upon a substantially flat, relatively rigid, glass or plastic substrate 24 to form a laminate, which laminate is thereafter positioned upon pane 14 (frame 12 is not shown) with the use, e.g., of securing strips 18. The relative rigidity of the laminate thus serves to maintain the width of the gap 20.

In an alternate embodiment of the method of the invention described with reference to, e.g., FIG. 1 above, instead of placing securing strips 18 upon pane 14 and then mounting enhancement 16 thereupon, one could instead first mount the strips 18 on the enhancement 16 and then secure the resultant structure to pane 14 by strips 18.

Turning aside from the issue of maintaining the width of gap 20, FIG. 1C illustrates a further embodiment of the invention in which securing strips 18 are located in a paired arrangement at congruent positions on both the window 10 and the enhancement 16. The simplest method is wherein the two strips 18 are secured to one another with the use of an adhesive, but alternate securing arrangements are within the scope of the present invention. For example, a magnetic material may be incorporated into the strips 18 whereupon enhancement 16 is at least partially secured to the window 10 by means of magnetic attraction between the two strips.

Strips 18 maybe mounted, respectively, on the pane 14 (or the window frame, not shown, as discussed below with regard to FIG. 2 et seq.) and the enhancement 16, with the use, for example, of an adhesive composition. Alternately, instead of a magnetic material, corresponding ones of securing strips 18 may incorporate a hook and loop arrangement such as a Velcro® brand fastener wherein the two strips 18 are secured together by interengagement of the corresponding hook and loop surfaces.

FIG. 2 is a perspective view of a further embodiment of the invention, i.e., in which the window enhancement is mounted to the window frame rather than the window pane.

FIG. 2 thus illustrates retrofitted window 110 which comprises frame 112, viewing pane 114 and enhancement 116 (which is partially broken away). As with FIG. 1 the enhancement shown is a switchable enhancement, e.g., an SPD film, but the invention is not limited to use with only such switchable enhancements as its scope also includes the non-switchable light modulating devices described above. Enhancement 116 is shown mounted upon frame portion 112 of window 110 for convenience with the use of securing strips 118, but replacing strips 118 with alternate mounting means such as screws, nails, etc. as described above, is also within the scope of this invention. As in FIG. 1, strips 118 need not be shaped as elongated rectangles (i.e., strip-shaped) as shown. That is, they can be provided in a variety of shapes and positioned on the frame at a variety of locations, i.e., at the top and the bottom, at the left and right sides, at all 4 positions, i.e., top, bottom and sides, etc. Moreover, as also described with reference to FIG. 1, the strips may be continuous or discontinuous and positioned in almost any imaginable orientation.

A variety of alternate embodiments wherein the enhancement is mounted upon the window frame portion are, of course, possible and intended to be included within the scope of the invention. For example, an enhancement 116 could be mounted utilizing pairs of securing strips (comprising, for example, a magnetic material or a hook and loop fastener), mounted at congruent locations on the frame and the enhancement, similar to the arrangement depicted in FIG. 1C. Additionally, frame portion 112 may be formed of a magnetized material, which may attract a metal strip mounted, e.g., by use of an adhesive, upon the enhancement. Alternately, the opposite arrangement could be used where enhancement 116 has a magnetic bar or strip mounted thereon, which is attracted to a metal portion of the window frame, or to a metal insert formed therein or attached thereto. Still further, frame portion 112 could be provided with a variety of "clip" or "catch" arrangements, adapted to mate with a corresponding structure(s) located on the window enhancement. Still other mounting arrangements, as would readily occur to one of ordinary skill in this art, are deemed to fall within the scope of this invention.

FIG. 2A is a cross-sectional view through window 110 of FIG. 2. FIG. 2A shows viewing pane 114 mounted within frame 112. Positioned upon frame 112 is securing strip(s) 118, to which is secured enhancement 116. Gap 120 is thus produced, as in the embodiment of FIG. 1, between pane 114 and enhancement 116. As with the embodiment illustrated in FIG. 1A, gap 120 may contain air or an inert gas, or else it may be at least partially evacuated.

In either of the enhancements shown in FIG. 1 or 2, in order to reduce reflections an anti-reflective coating (not shown) such as, but not limited to magnesium fluoride, can be applied to one or more surfaces of the window and/or, in the case of an enhancement comprising a switchable glazing, upon the surface of, e.g., the SPD film or the SPD light valve. A variety of alternate materials are well-known in the art for providing such anti-reflective coatings and the use of such materials upon retrofitted windows of the type described herein is considered to be within the broad scope of the invention.

Although not shown in the accompanying drawings, in those embodiments of the invention incorporating a switchable enhancement such as an SPD film or SPD light valve, the film or light valve will further comprise, in a manner well known in the art, at least one electrode and will have electrical connectors or leads extending from the conductive electrode(s) adjacent to the activatable material comprising the film or light valve, to a source of voltage to permit the film or light valve to be turned on and off. The voltage source may, for example, comprise a battery system having an inverter to permit AC voltage to be obtained, or a photovoltaic system, if voltage requirements are low enough. Still further, the voltage source may be a standard wall plug. As these elements are well known to those of ordinary skill in the art, and well within the range of skill of such individuals, there is no need to illustrate them.

FIGS. 4 and 5 are directed to alternate embodiments of the invention involving double-pane, i.e., double-glazing windows. Although they show an enhancement mounted upon the viewing pane portion of the retrofitted window with the use of securing strips, it will be understood that the enhancement may, instead, be mounted for example on the frame portion (not shown) in those instances wherein the frame extends into the space between the two viewing panes, and that the mounting can be carried out using a variety of mounting means including clips, nails, screws, rivets, etc.

Turning first to FIG. 4, there is shown a double-glazing window comprising a first viewing pane 214 and a second viewing pane 215 in series, spaced a distance apart from one another by a frame (not shown). Secured to one said viewing pane 215 is enhancement 216, i.e., shown as an SPD film for illustrative purposes. Enhancement 216 is attached to pane 215 with securing strip(s) 218. Gap 220 is thus produced between pane 215 and enhancement 216, which gap may contain, e.g., air or a noble gas, or be partially evacuated as described above. In an alternate embodiment enhancement 216 may be mounted instead on pane 214.

In an alternate embodiment not illustrated in the drawing figures, in the case of a double glazing window, the window enhancement 216 may be applied directly to an interior surface of either pane 214 or 215, i.e., without the use of securing strips 218. If done with sufficient care under controlled conditions, i.e., in a factory setting, not out in the field on already installed windows, it is believed that the enhancement may be able to be applied in a manner to prevent the wrinkling, bubbling and/or inclusions encountered in prior art retrofitted windows. The inventors are not presently aware of any manufacturer offering such a service/product.

FIG. 5 illustrates a variation of the arrangement shown in FIG. 4 wherein enhancement 216 (illustrated for convenience as an SPD film) is laminated upon a supporting substrate 222 such as a relatively rigid sheet of glass or plastic, and the resultant laminate is mounted to a viewing pane 215 by securing strip(s) 218. As with the embodiment of FIG. 4, gap 220 is produced between the laminate and the viewing pane, which gap may contain a gas or be partially evacuated. If desired, an arrangement such as that shown in FIG. 1C can be used wherein securing strips 218 may be mounted upon both the viewing pane and the laminate at corresponding locations, which strips 218 are thereafter secured to one another by, e.g., an adhesive, a magnetic attraction or a hook and loop arrangement.

Each of the patents and other references noted herein is incorporated into the present specification to the degree necessary to comprehend the invention.

What is claimed is:

1. A method for retrofitting a window by combining the window with a window enhancement, the method comprising:
   providing a window comprising a relatively transparent viewing pane, said viewing pane having first and second opposed viewing surfaces;
   providing at least one mounting means adapted for securing a window enhancement to said window; and
   securing a window enhancement to said window with said at least one mounting means such that the enhancement overlies at least a portion of said viewing pane, and wherein a gap is produced between the pane and the enhancement in areas where the enhancement is not in contact with the at least one mounting means.

2. The method according to claim 1, wherein said at least one mounting means is installed on the viewing pane of the window.

3. The method according to claim 2, wherein at least two said mounting means are positioned along two opposed edge portions, respectively, on one said viewing surface of the pane.

4. The method according to claim 2, wherein at least four said mounting means are positioned, respectively, at a top and a bottom, and on first and second longitudinal edge portions on one said opposed surface of the viewing pane.

5. The method according to claim 1, wherein said mounting means is selected from the group consisting of securing strips, screws, nails, bolts, snaps, rivets, staples and magnetic metal bars.

6. The method according to claim 1, which further comprises initially laminating said window enhancement to a relatively rigid glass or plastic substrate, and thereafter securing a resultant laminate to said window with said mounting means.

7. The method according to claim 1, wherein said window enhancement is a switchable glazing.

8. The method according to claim 7, wherein said switchable glazing is selected from the group consisting of SPD films, SPD light valves, electrochromic films or windows, and liquid crystal films or windows.

9. The method according to claim 1, wherein said window enhancement is a non-switchable light modulating device.

10. The method according to claim 9, wherein said non-switchable light modulating device is selected from the group consisting of tinted windows, screens, solar control films, impact resistant films and flexible or rigid panels.

11. The method according to claim 1, wherein said at least one mounting means is initially attached to the window enhancement, whereupon the enhancement with said mounting means is thereafter secured to said window by said mounting means.

12. The method according to claim 1, wherein said window further comprises a frame portion configured and adapted to support the viewing pane, said frame portion comprising a top member, a bottom member and first and second longitudinal side members, said first and said second side members being connected to the top and bottom members, respectively, to form said frame portion.

13. The method according to claim 12, wherein said at least one mounting means is installed upon said window frame portion.

14. The method according to claim 13, wherein two said mounting means for securing said window enhancement to said window are installed upon the top and bottom members, respectively, of the frame portion, co-planar with the viewing pane of said window.

15. The method according to claim 13, wherein at least two said mounting means for securing said window enhancement to said window are installed upon said first and said second longitudinal side members, respectively, of said frame portion, co-planar with the viewing pane of said window.

16. The method according to claim 13, wherein at least four said mounting means for securing said window enhancement to said window are installed on the top, the bottom and the first and second longitudinal side members of said frame portion, co-planar with the viewing pane of said window.

17. The method according to claim 13, wherein said mounting means are selected from the group consisting of securing strips, screws, nails, bolts, snaps, rivets, staples and magnetic metal bars.

18. The method according to claim 1, which further comprises providing said window with at least one projecting spacer member positioned and adapted to maintain the gap between the window enhancement and the window at a predetermined width.

19. The method according to claim 1, which further comprises providing said window enhancement with at least one projecting spacer member positioned and adapted to maintain the gap between the window enhancement and the window at a predetermined width.

20. The method according to claim 1, wherein said mounting means is located at corresponding positions upon both the window and the window enhancement.

21. The method according to claim 1, wherein said mounting means is at least one substantially transparent securing strip.

22. The method according to claim 1, which further comprises substantially removing dust and dirt from said window prior to securing the window enhancement thereto.

23. The method according to claim 1, wherein said at least one mounting means is provided, on at least one surface thereof, with an adhesive material to facilitate bonding between said window enhancement and said window.

24. The method according to claim 23, wherein said adhesive material is selected from the group consisting of pressure sensitive adhesives, heat curable adhesives and radiation curable adhesives.

25. The method according to claim 23, which further comprises protecting an adhesive surface of said at least one mounting means, prior to its use for securing a window enhancement to a window, with a release paper, said release paper being removed prior to securing said window enhancement to the window.

26. The method according to claim 1, wherein each said mounting means comprises a magnetic material and wherein said means is located on corresponding surfaces of both the window and the window enhancement such that the window enhancement is at least partially secured to said window by a magnetic attraction between corresponding mounting means.

27. The method according to claim 26, wherein said window further comprises a frame portion configured and adapted to support said viewing pane and wherein mounting means applied to said window are positioned upon said frame portion.

28. The method according to claim 1, wherein each said mounting means comprises a hook and loop structure and wherein said mounting means is located upon corresponding surfaces of both the window and the window enhancement such that the window enhancement is at least partially secured to said window due to engagement between said hooks and said loops located on corresponding mounting means.

29. The method according to claim 28, wherein said window further comprises a frame portion configured and adapted to support said viewing pane and wherein mounting means applied to said window are positioned upon said frame portion.

30. The method according to claim 1, which further comprises applying an anti-reflective coating applied upon said window enhancement.

31. The method according to claim 1, wherein said window comprises a plurality of said viewing panes positioned in series, wherein each said pane is spaced apart from at least one adjacent pane by a window frame and wherein at least one said window enhancement is secured by said mounting means on an interior portion of at least one said pane adjacent said space.

32. The method according to claim 31, wherein said window is a double glazing window comprising two viewing panes positioned in series and spaced apart by said frame, and wherein said window enhancement is positioned upon an inner surface of at least one said viewing pane and has a surface exposed to said space.

33. A method for retrofitting a multi-pane window by combining at least one said pane with a window enhancement, said method comprising:

providing a window comprising a frame portion and a plurality of relatively transparent viewing panes positioned in series within said frame, said frame configured and adapted to support said viewing panes in said series, wherein each said pane is separated from at least one adjacent pane by a space between said separated panes;

providing at least one window enhancement selected from the group of switchable and non-switchable window enhancements for combining with said window; and securing a window enhancement, by use of mounting means, upon at least a portion of at least one of said viewing panes, on an inner surface thereof separated from an adjacent one of said panes by said space.

34. The method according to claim 33, wherein said window enhancement is a switchable glazing.

35. The method according to claim 34, wherein said switchable glazing is selected from the group consisting of SPD films, SPD light valves, electrochromic films or windows, and liquid crystal films or windows.

36. The method according to claim 33, wherein said window enhancement is a non-switchable light modulating device.

37. The method according to claim 36, wherein said non-switchable light modulating device is selected from the group consisting of tinted windows, screens, solar control films, impact resistant films and flexible or rigid panels.

38. A method for retrofitting a window by combining the window with a window enhancement, said method comprising:

providing a window comprising a frame portion and at least one relatively transparent viewing pane, each said pane viewing having first and second opposed viewing surfaces and said frame portion adapted to secure and support said at least one pane;

laminating a switchable window enhancement to a glass or plastic substrate to increase rigidity of said enhancement;

providing a plurality of mounting means adapted for securing the laminate upon said window; and securing said laminate to the window with said mounting means such that a gap is produced between the laminate and at least one said viewing pane, said gap having a substantially constant width in an area between the laminate and the viewing pane.

39. The method according to claim 38, wherein the mounting means on said window are applied to said frame portion.

40. A method for retrofitting a window by combining the window with a window enhancement, the method comprising:

providing a window comprising a relatively transparent viewing pane, said viewing pane having first and second opposed viewing surfaces;

providing at least one mounting means adapted for securing a window enhancement to said window; and securing a window enhancement to said window with at least one mounting means such that the enhancement overlies at least a portion of said viewing pane, said window enhancement adapted to selectively control passage therethrough of electromagnetic radiation selected from the group consisting of visible radiation and infra-red radiation, and wherein a gap is produced between the pane and the enhancement in areas where the enhancement is not in contact with the at least one mounting means.

41. The method according to claim 40, wherein said at least one mounting means is installed on the viewing pane of the window.

42. The method according to claim 40, wherein said mounting means is selected from the group consisting of securing strips, magnetic bars, hook and loop fasteners, screws, nails, bolts, snaps, rivets and staples.

43. The method according to claim 40, which further comprises initially laminating said window enhancement to a relatively rigid glass or plastic substrate, and thereafter securing a resultant laminate to said window with said mounting means.

44. The method according to claim 40, wherein said window enhancement is a switchable glazing or a non-switchable light modulating device.

45. The method according to claim 40, wherein said window further comprises a frame portion and wherein said at least one mounting means is installed upon said window frame portion.

46. The method according to claim 40, which further comprises providing said window or said window enhancement with at least one projecting spacer member positioned and adapted to facilitate maintenance of the gap between the window enhancement and the window at a predetermined width.

47. The method according to claim 40, which further comprises locating mounting means at corresponding positions upon both the window and the window enhancement.

48. The method according to claim 40, which further comprises applying an anti-reflective coating upon said window enhancement.

49. The method according to claim 40, wherein said window comprises a plurality of said viewing panes positioned in series, wherein each said pane is spaced apart from at least one adjacent pane by a window frame, and wherein at least one said window enhancement is secured by said mounting means on an interior portion of at least one said pane adjacent said space.

50. The method according to claim 40, wherein said window comprises a plurality of said viewing panes positioned in series, wherein each said pane is spaced apart from at least one adjacent pane by a window frame, and wherein at least one said window enhancement is secured by said mounting means on an interior portion of at least one said pane adjacent said space.

51. A method for retrofitting a window by combining the window with a window enhancement, the method comprising:

providing a window comprising a relatively transparent viewing pane, said viewing pane having first and second opposed viewing surfaces;

providing at least one mounting means adapted for securing a window enhancement to said window; and securing a window enhancement to said window with at least one said mounting means such that the enhancement overlies at least a portion of said viewing pane, wherein a gap is produced between the pane and the enhancement in areas where the enhancement is not in contact with the at least one mounting means, wherein each said mounting means comprises a magnetic material, and wherein said means is located on corresponding surfaces of both the window and the window enhancement such that the window enhancement is at least partially secured to said window by a magnetic attraction between corresponding mounting means.

52. The method according to claim 51, which further comprises initially laminating said window enhancement to a relatively rigid glass or plastic substrate, and thereafter securing a resultant laminate to said window with said mounting means.

53. The method according to claim 51, wherein said window enhancement is a switchable glazing or a non-switchable light modulating device.

54. The method according to claim 51, wherein said window further comprises a frame portion and wherein said at least one mounting means is installed upon said window frame portion.

55. The method according to claim 51, which further comprises providing said window or said window enhancement with at least one projecting spacer member positioned and adapted to facilitate maintenance of the gap between the window enhancement and the window at a predetermined width.

56. The method according to claim 51, wherein said window comprises a plurality of said viewing panes positioned in series, wherein each said pane is spaced apart from at least one adjacent pane by a window frame, and wherein at least one said window enhancement is secured by said mounting means on an interior portion of at least one said pane adjacent said space.

57. A method for retrofitting a window by combining the window with a window enhancement, the method comprising:

providing a window comprising a relatively transparent viewing pane, said viewing pane having first and second opposed viewing surfaces;

providing at least one mounting means adapted for securing a window enhancement to said window; and securing a window enhancement to said window with at least one said mounting means such that the enhancement overlies at least a portion of said viewing pane, wherein a gap is produced between the pane and the enhancement in areas where the enhancement is not in contact with the at least one mounting means, wherein each said mounting means comprises a hook and loop structure and wherein said mounting means is located on corresponding surfaces of both the window and the window enhancement such that the window enhancement is at least partially secured to said window due to engagement between said hooks and said loops located on corresponding mounting means.

58. The method according to claim 57, which further comprises initially laminating said window enhancement to a relatively rigid glass or plastic substrate, and thereafter securing a resultant laminate to said window with said mounting means.

59. The method according to claim 57, wherein said window enhancement is a switchable glazing or a non-switchable light modulating device.

60. The method according to claim 57, wherein said window further comprises a frame portion and wherein said at least one mounting means is installed upon said window frame portion.

61. The method according to claim 57, which further comprises providing said window or said window enhancement with at least one projecting spacer member positioned and adapted to facilitate maintenance of the gap between the window enhancement and the window at a predetermined width.

\* \* \* \* \*

UNITED STATES PATENT AND TRADEMARK OFFICE
CERTIFICATE OF CORRECTION

PATENT NO.   : 6,429,961 B1                                             Page 1 of 1
DATED        : August 6, 2002
INVENTOR(S)  : Joseph M. Harary and Robert L. Saxe It is certified that error appears in the above-identified patent and that said Letters Patent is hereby corrected as shown below:

Column 16,
Lines 66 & 67,
1. Delete claim 50 of the patent.

Column 17,
Lines 27, 32, 35, 39 and 45,
2. Change the dependencies of claims 52-56, inclusive, from "claim 51" to -- claim 50 --.

Column 18,
Lines 28, 33, 36 and 40,
3. Change the dependencies of claims 58-61, inclusive, from "claim 57" to -- claim 56 --.

Columns 17 and 18,
4. Renumber patent claims 51-61, inclusive, as claims 50-60, inclusive.

Signed and Sealed this

Nineteenth Day of August, 2003

JAMES E. ROGAN
*Director of the United States Patent and Trademark Office*